(12) United States Patent
Kim (10) Patent No.: US 9,489,123 B2
(45) Date of Patent: Nov. 8, 2016

(54) METHOD FOR SENSING TOUCH PRESSURE AND DIGITAL DEVICE USING THE SAME

(71) Applicant: WILUS INSTITUTE OF STANDARDS AND TECHNOLOGY INC., Seoul (KR)

(72) Inventor: Seung Il Kim, Seoul (KR)

(73) Assignee: WILUS INSTITUTE OF STANDARDS AND TECHNOLOGY INC., Seoul (KR)

( * ) Notice: Subject to any disclaimer, the term of this patent is extended or adjusted under 35 U.S.C. 154(b) by 143 days.

(21) Appl. No.: 14/164,269

(22) Filed: Jan. 27, 2014

(65) Prior Publication Data

US 2014/0210747 A1 Jul. 31, 2014

(51) Int. Cl.
| | | |
|---|---|---|
| *G06F 3/041* | (2006.01) | |
| *G06F 3/042* | (2006.01) | |
| *A61B 5/02* | (2006.01) | |
| *G06F 3/0488* | (2013.01) | |
| *G06F 3/0487* | (2013.01) | |

(52) U.S. Cl.
CPC .......... *G06F 3/0488* (2013.01); *G06F 3/0487* (2013.01); *G06F 2203/04105* (2013.01)

(58) Field of Classification Search
CPC ........ G06F 3/033; G06F 3/041; G06F 3/042; G06F 3/045; G06F 3/048; G06F 3/0414; G09G 5/00; G09G 5/08; G09G 5/34; A61B 5/02; A61B 5/05; G06K 9/00
See application file for complete search history.

(56) References Cited

U.S. PATENT DOCUMENTS

| | | | | |
|---|---|---|---|---|
| 2001/0025917 | A1* | 10/2001 | Asada | G01L 1/248 250/221 |
| 2009/0143688 | A1* | 6/2009 | Rekimoto | A61B 5/0059 600/504 |
| 2009/0312654 | A1* | 12/2009 | Kasama | G06F 3/042 600/500 |
| 2010/0245395 | A1* | 9/2010 | LeBert | G06F 1/169 345/661 |
| 2012/0013566 | A1* | 1/2012 | Chung | G06F 3/0414 345/174 |
| 2012/0070043 | A1* | 3/2012 | Higuchi | A61B 5/1172 382/124 |
| 2013/0050078 | A1* | 2/2013 | Nakamura | G06F 3/03547 345/158 |
| 2013/0147844 | A1* | 6/2013 | Isozu | H04N 5/232 345/659 |
| 2013/0257751 | A1* | 10/2013 | Stafford | G06F 3/0488 345/173 |

* cited by examiner

*Primary Examiner* — Ilana Spar
*Assistant Examiner* — Nguyen H Truong
(74) *Attorney, Agent, or Firm* — Park, Kim & Suh, LLC

(57) ABSTRACT

The present invention relates to a method for sensing touch pressure on a digital device by using image data sensed by a camera unit.
To achieve these objects and other advantages, the present invention provides the method for sensing touch pressure and a digital device using the same, wherein the method comprises obtaining image data sensed by a camera unit of the digital device; obtaining illumination value sensed by a illumination sensor of the digital device; extracting color information of the image data; determining whether a touch input has been performed on the camera unit; and sensing the touch pressure of the touch input based on the extracted color information and the obtained illumination value, if it is determined that the touch input has been performed in the determining step.

20 Claims, 8 Drawing Sheets

METHOD FOR SENSING TOUCH PRESSURE AND DIGITAL DEVICE USING THE SAME

This application claims the benefit of U.S. Provisional Application No. 61/756,469, filed on Jan. 25, 2013, which is hereby incorporated by reference as if fully set forth herein.

BACKGROUND OF THE INVENTION

1. Field of the Invention

The present invention relates to a method for sensing touch pressure and a digital device using the same, and more particularly, to a method for sensing touch pressure on a digital device by using the image data detected by a camera unit.

1. Discussion of the Related Art

Touch screens are widely used as a mean detecting users' input on digital devices. A touch screen is used to detect coordinates of a touch input directly on the screen, and generally, comprises a display unit and a touch panel, which are combined in a digital device. Users may perform touch inputs on a display object on a touch screen, and may operate the corresponding display object intuitively.

Common techniques for implementing a touch screen are a resistive type and a capacitive type. First, the resistive touch screen is in a form of several layers (screens) stacked on a display unit. For example, the outmost layer (where hands and pens contact) is a layer of soft and scratch-resistant material, and the next layer plays a shock-relieving role. Then, two sheets of transparent conductive layer, which detects inputs, are placed in sequence. If a user presses the screen, two sheets of transparent conductive layer get to contact each other to change electric current and resistance. The resistive touch screen may detect the change to determine horizontal and longitudinal coordinates of the user input. Therefore, the resistive touch screen is capable of precisely detecting touch inputs from a user's finger as well as auxiliary tools such as a stylus. However, compared to the capacitive touch screen, the resistive touch screen has some limitations, including slow response and low display quality due to several layers.

Next, the capacitive touch screen detects micro current flowing in a human body. In short, the whole screen is coated with conductive material to let electric current flow continuously. If a user's finger touches the screen, electrons flowing on the screen are attracted to the touch point. Then, the capacitive touch screen detects the touch input through a sensor in the corner of the touch screen. The capacitive touch screen has several advantages, including fast response and good display quality, as it is a screen coated with conductive material. However, there are also several limitations in the capacitive touch screen. For example, a finger or an exclusive stylus for a capacitive type screen should be used for the operation.

Meanwhile, additional devices are required in order to sense user's touch pressure on traditional touch screens. For example, touch pressure may be sensed only when a stylus connected to the digital device is equipped with pressure-sensing means and the stylus is used for performing touch inputs.

SUMMARY OF THE INVENTION

The present invention aims to sense user's touch pressure with existing devices mounted on a digital device even without any additional mean for sensing touch pressure. Especially, the present invention aims to sense user's touch pressure simply by using a digital device, for example a camera unit mounted on most of up-to-date portable devices. Further, the present invention aims to sense the user's touch pressure precisely in various environments by sensing the touch pressure based on sensing values from a camera unit and a illumination sensor, which are mounted on the digital device.

To achieve these objects and other advantages and in accordance with the purpose of the invention, as embodied and broadly described herein, the method for sensing touch pressure according to embodiments of the present invention comprises obtaining image data sensed by a camera unit of a digital device; obtaining illumination value sensed by a illumination sensor of the digital device; extracting color information of the image data; determining whether touch input has been performed on the camera unit; and sensing touch pressure of the touch input based on the extracted color information and the obtained illumination value.

Further, the digital device according to the embodiments of the present invention comprises a processor controlling the operation of the digital device; the camera unit sensing the image data and delivering the sensed value to the processor; and the illumination sensor sensing the illumination value and delivering the sensed value to the processor, wherein the processor obtains the image data sensed by the camera unit and the illumination value sensed by the illumination sensor, extracts the color information from the image data, determines whether the touch input has been performed on the camera unit and, if it is determined that the touch input has been performed, senses the touch pressure of the touch input based on the extracted color information and the obtained illumination value.

According to the embodiments of the present invention, the digital device is capable of sensing the touch pressure of the touch input on the device, which applies various power levels of the user input to content of the digital device.

According to the embodiments of the present invention, traditional digital devices are capable of sensing the touch pressure of the user's touch input without any cost for mounting additional devices, as the camera unit mounted on the traditional digital devices is used.

According to the embodiments of the present invention, the user's touch pressure may be sensed precisely in various environments with continuously changing external illumination values, as the user's touch pressure is sensed based on the image data sensed by the camera unit and the illumination value sensed by the illumination sensor.

According to another embodiment of the present invention, the digital device is capable of providing an additional user interface to change into the mode for receiving the touch input, through which the touch pressure may be sensed based on the precisely perceived user's intention.

DETAILED DESCRIPTION OF THE INVENTION

For terms used in the present description, current generic terms used widely were selected by considering functions of the present invention, but terms may vary according to intention of those skilled in the art, usual practices, or introduction of new technologies. Some of the terms mentioned in the description of the present invention may have been selected by the applicant at his or her discretion, and in such cases the detailed meanings thereof will be described in relevant parts of the description herein. Thus, the terms used in this description should be interpreted based on the substantial meanings of the terms and the whole content of this description rather than their simple names or meanings.

Figure 1:
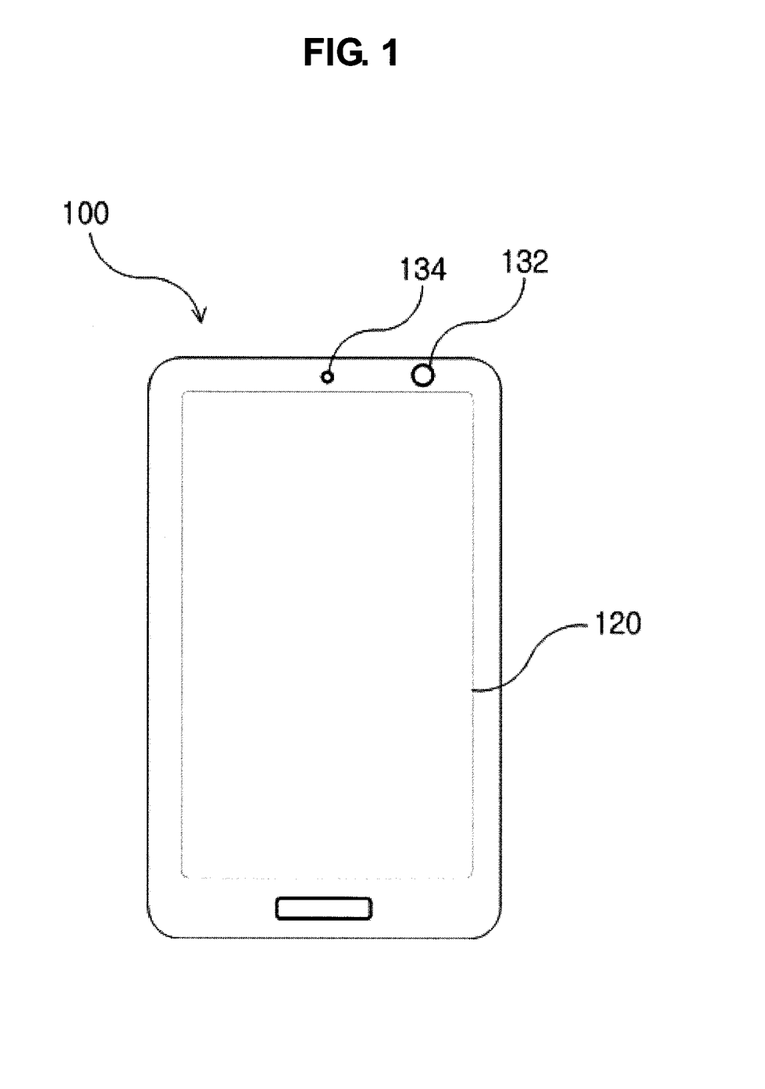
FIG. 1 is a diagram schematically illustrating a digital device according to an embodiment of the present invention.

FIG. 1 illustrates a digital device 100 according to an embodiment of the present invention. According to the embodiment of the present invention, the digital device 100 is equipped with a camera unit 132 and an illumination sensor 134.

The camera unit 132 senses an external image and deliver the sensed image to a processor (not shown in the drawing). Further, the illumination sensor 134 senses illumination around the digital device 100, and delivers the sensed illumination value to the processor. According to the embodiment of the present invention, the digital device 100 may be equipped with at least one camera unit 132, which may be mounted on front side, rear side, or both sides of the digital device 100.

Meanwhile, according to the embodiment of the present invention, the digital device 100 may be equipped with a display unit 120. The display unit 120 displays an image based on a control command of the processor of the digital device 100. According to one embodiment of the present invention, the display unit 120 may be a touch sensitive display unit. For example, a touch panel may be configured to combine with a display unit to form a layer.

When the camera unit 132 is operated in the capture mode of the digital device 100, the display unit 120 is capable of displaying the image data sensed by the camera unit 132. In this case, the processor is capable of correcting the image data based on the illumination value sensed by the illumination sensor 134, and the display unit 120 is capable of displaying the corrected image data.

In the present invention, the digital device 100 comprises various devices, including the camera unit 100 and the illumination sensor 134. For example, the digital device 100 includes a smartphone, PDA (Personal Digital Assistant), a notebook, a tablet PC, and various kinds of other devices capable of sensing the image data.

Figure 2:
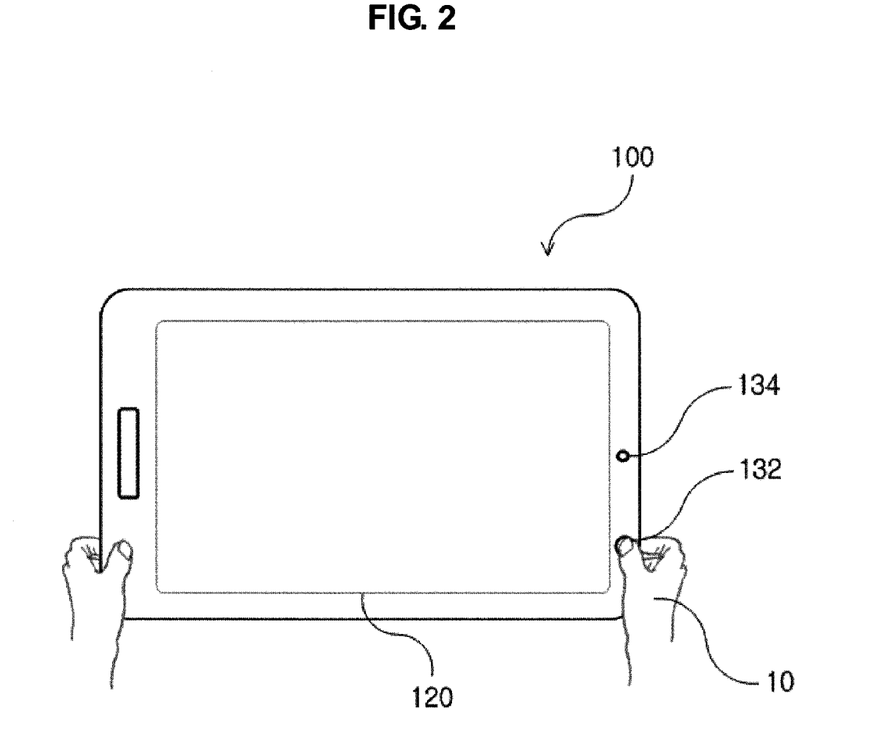
FIG. 2 is a drawing illustrating a scene of performing a touch input on the digital device according to an embodiment of the present invention.

FIG. 2 illustrates a scene of performing the touch input on the digital device 100 in FIG. 1, according to an embodiment of the present invention. In accordance with the embodiment of the present invention, a user may perform the touch input 10 on the camera unit 132 of the digital device 100.

When the touch input has been performed on the camera unit 132 mounted on the digital device 100, a part of the illumination delivered from outside to the camera unit 132 is interrupted. Therefore, the image data sensed by the camera unit 132 shows different colors depending on the illumination transmission level. In this case, the touch pressure of the touch input 10 on the camera unit 132 and the illumination around the digital device 100 may give effect to the image data.

Table 1 below represents the variation of the image data sensed through the camera unit 132 when the external illumination and the touch pressure of the touch input on the camera unit 132 are varied. Each value in Table 1 represents RGB values of an arbitrary pixel in the image data sensed through the camera unit 132.

TABLE 1

| Condition | R-value | G-value | B-value |
|---|---|---|---|
| I. Illumination value: 5000, Touch pressure: Strong | 208 | 44 | 53 |
| II. Illumination value: 5000, Touch pressure: Weak | 118 | 38 | 47 |
| III. Illumination value: 1000, Touch pressure: Strong | 79 | 37 | 38 |
| IV. Illumination value: 1000, Touch pressure: Weak | 54 | 33 | 30 |

Referring to Table 1, the measurement of the R (Red) value is higher than the measurements of the G (Green) value or the B (Blue) value under the identical condition, as the light around the digital device 100 is inputted through user's finger. For example, as blood flows in the user's fingers, the image data detected in the camera unit 132 shows reddish.

Comparing to Conditions I and II in Table 1, which are the environment with the identical illumination value, the R-value is 208 under Condition I and 118 under Condition II. In short, the R-value of the image data is varied greatly, depending on the touch pressure under the identical illumination values. However, the G-value and the B-value are not changed greatly even with the variation of the touch pressure. Further, comparing to Conditions III and IV, which are the environment with the identical illumination values, the greater variation of the R-value is measured than the variation of the G-value or the B-value.

Meanwhile, as the RGB measurements in any one pixel may contain errors due to various causes, the R-value measurement of the whole pixel, which is averaged from the image data under each condition in Table 1, are as follows:

TABLE 2

| | Condition I | Condition II | Condition III | Condition IV |
|---|---|---|---|---|
| Averaged R-value | 192.5661 | 97.5054 | 65.9734 | 47.3062 |

Referring to Table 2, the measurement of the R-value of the whole pixel from the image data is higher when the touch pressure gets higher under the environment with the identical illumination value. Further, the R-value of the image data is generally measured to be higher under Conditions I and II, which are the environments with high illumination value, than under Conditions III and IV, which are the environments with low illumination value. Therefore, R-value of the image data may be affected by i) the strength of the touch pressure on the camera unit 132, and ii) the illumination value around the digital device 100.

According to the embodiment of the present invention, the digital device 100 is capable of obtaining RGB values of the image data sensed by the camera unit 132 and the external illumination value sensed by the illumination sensor 134, and is capable of sensing the touch pressure of the touch input on the camera unit 132 based on the values. The digital device 100 is capable of changing into the touch pressure sensing mode sensing user's touch pressure on the camera unit 132, and while in the touch pressure sensing mode, the digital device 100 is capable of sensing the user's touch pressure on the camera unit 132 based on the image data sensed by the camera unit 132 and the illumination value sensed by the illumination sensor 134.

Meanwhile, according to Table 2, the difference of the R-values based on the variation of the touch pressure is 197% (192.5661/97.5054*100) under Conditions I and II, where the external illumination value is high, and the difference of R-values based on the variation of the touch pressure was 139% (65.9734/47.3062*100) under Conditions III and IV, where the external illumination value is low. It means the R-value variation of the image data based on the variation of the touch pressure is greater when the external illumination value is high than when the external illumination value is low. Therefore, the digital device 100 in the present invention may establishing greater difference of pressure sensing values due to the R-value variation of the image data when the external illumination value is high than when the external illumination value is low.

Figure 3:
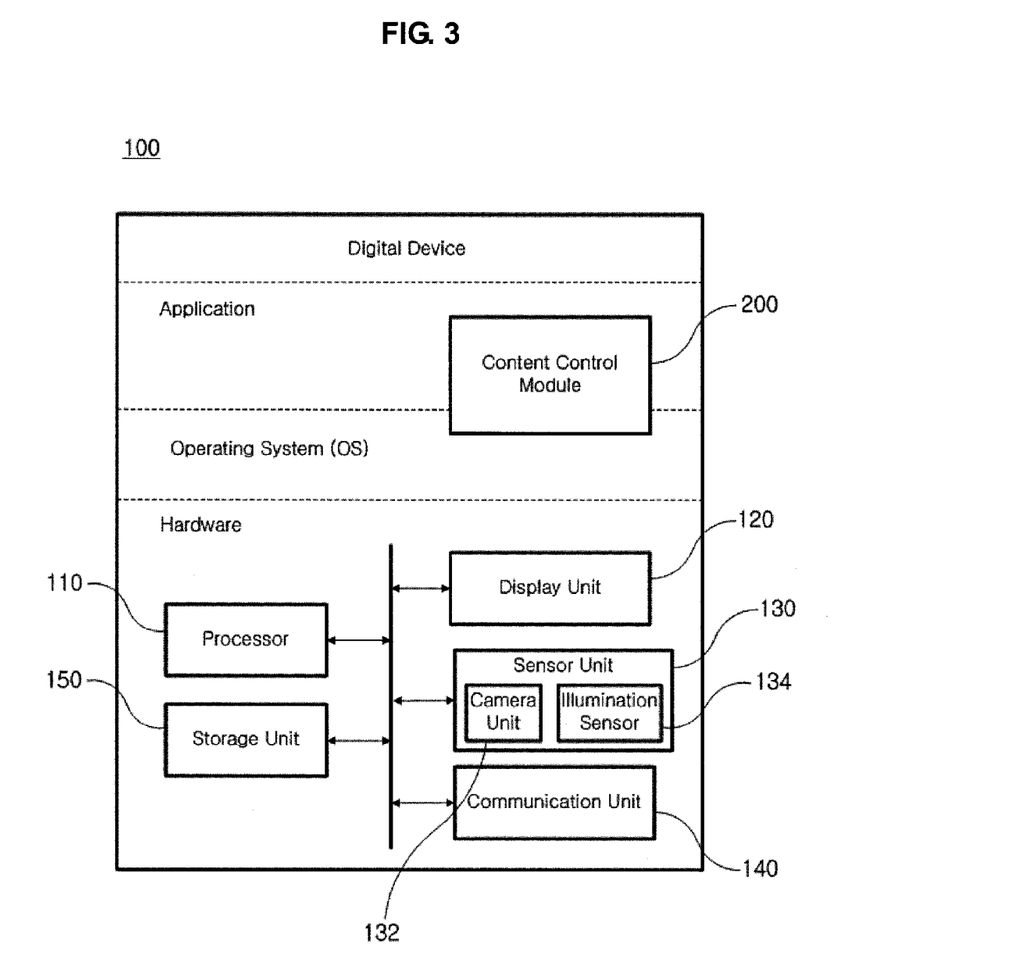
FIG. 3 is a block diagram illustrating the digital device according to an embodiment of the present invention.

FIG. 3 is a block diagram illustrating the digital device 100 according to one embodiment of the present invention. Referring to FIG. 3, the digital device 100 in the present invention may include a hardware layer, an operating system layer, and an application layer.

First, the hardware layer of the digital device 100 may include a processor 110, a display unit 120, a sensor unit 130, a communication unit 140, and a storage unit 150.

The display unit 120 outputs images on a display screen. The display unit 120 is capable of outputting images based on the content executed in the processor 110 or a control command of the processor 110. In the present invention, the display unit 120 may include a touch sensitive display unit.

The sensor unit 130 is capable of detecting an environment around the digital device 100 through at least one of sensors equipped on the digital device 100 and delivering it to the processor 110. Further, the sensor unit 130 in the present invention is capable of detecting a user's input and delivering the input to the processor 110. In this case, the sensor unit 130 may include at least one sensing means.

As one embodiment, the at least one sensing means may include a gravity sensor, a geomagnetic sensor, a motion sensor, a gyro sensor, an acceleration sensor, an infrared sensor, an inclination sensor, a brightness sensor, an altitude sensor, an odor sensor, a temperature sensor, a depth sensor, a pressure sensor, a bending sensor, an audio sensor, a video sensor, a Global Positioning System (GPS) sensor, a touch sensor, or a fingerprint sensor. The sensor unit 130 is a generic term for various sensing means described above, and is capable of sensing various user inputs and the environment of the digital device 100 and delivering the sensed data to the processor 110 so as to enable the processor 110 to perform corresponding operations. The above-described sensors may be included as individual elements in the digital device 100 or may be included as at least one integrated element in the digital device 100.

According to the embodiment of the present invention, the sensor unit 130 includes a camera unit 132 and an illumination sensor 134. The camera unit 132 senses an external image and delivers the sensed image data to the processor. Further, the illumination sensor 134 senses illuminations around the digital device 100, and delivers the sensed illumination value to the processor. If a digital device 100 is in the capture mode, the processor 110 is capable of displaying the image data sensed by the camera unit 132 on the display unit 120. In this case, the processor is capable of correcting the image data by using the illumination value sensed by the illumination sensor 134, and the display unit 120 is capable of displaying the corrected image data. Meanwhile, according to the embodiment of the present invention, if the digital device 100 is in the touch pressure sensing mode, the processor 110 is capable of sensing user's touch pressure on the camera unit 132 based on the image data sensed by the camera unit 132 and the illumination value sensed by the illumination sensor 134.

Next, the communication unit 140 is capable of transmitting/receiving data by communicating with external devices or servers through various protocols. In the present invention, the communication unit 140 is capable of accessing a server or a cloud through a network and transmitting/receiving digital data, for example content. In the present invention, the digital device 100 may be selectively equipped with the communication unit 140.

Next, the storage unit 150 of the present invention is capable of storing various digital data such as video, audio, photos, and applications. The storage unit 150 includes various storage media for digital data, such as a flash memory, a Random Access Memory (RAM), and a Solid State Drive (SSD). Further, the storage unit 150 is capable of storing the content that the communication unit 140 receives from the external device or the server.

The processor 110 of the present invention is capable of executing content stored in the storage unit 150, or content received through data communication. The processor 110 is capable of executing various applications and processing the internal data of the digital device 100. In the embodiment of the present invention, the processor 110 is capable of operating a content control module 200 and controlling the content of the digital device 100 based on the control command of the content control module 200. Additionally, the processor 110 is capable of controlling individual units of the above described digital device 100 and controlling data transmission/reception among the units.

Next, the operating system layer of the digital device 100 may include the operating system controlling individual units of the digital device 100. The operating system enables applications of the digital device 100 to control and use individual units on the hardware layer. The operating system distributes resources of the digital device 100 efficiently, and prepares the environment where individual applications are executed. Meanwhile, the application layer of the digital device 100 may include at least one application. The application includes various forms of programs to enable a specific operation to be performed. The application is capable of using resources of the hardware layer with the help of the operating system.

According to the embodiment of the present invention, the digital device 100 is equipped with the content control module 200 to control the content. According to the embodiment of the present invention, the content control module 200 is capable of calculating the touch pressure on the camera unit 132 based on the sensing values from the camera unit 132 and the illumination sensor 134. According to the embodiment of the present invention, the content control module 200 may be mounted on the operating system, or the application. For example, the content control module 200 may be an embedded module integrated into the operating system of the digital device 100, or the module provided by the application itself.

The digital device 100 illustrated in FIG. 3 is a block diagram according to one embodiment of the present invention, where separate blocks are illustrated as logically distinguished elements of the device. Accordingly, the elements of the above described device may be mounted in a single chip or in multiple chips, depending on the design of the device.

Figure 4:
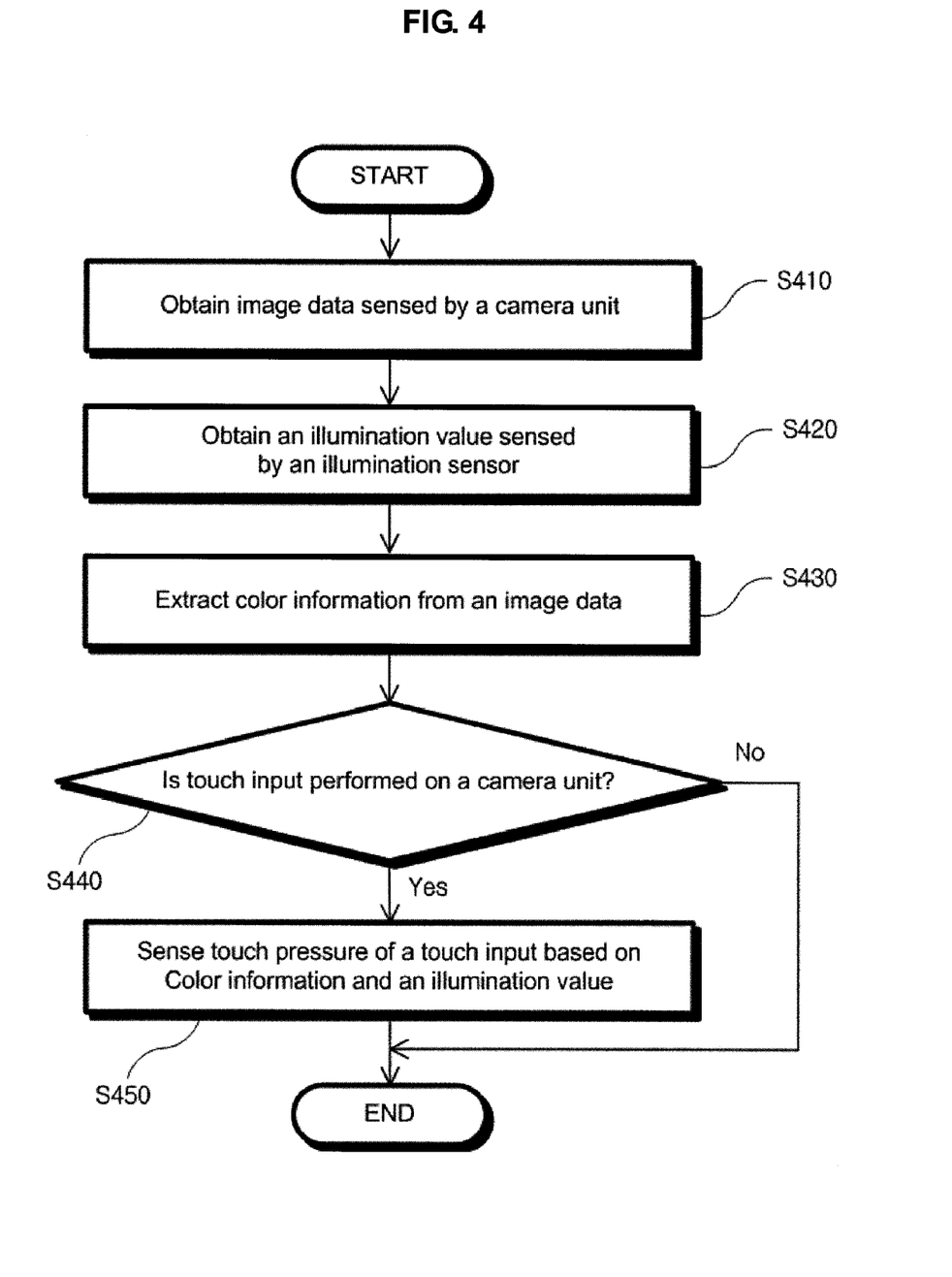
FIG. 4 is a flowchart illustrating the method for sensing touch pressure according to an embodiment of the present invention.

FIG. 4 is a flowchart illustrating the method for sensing the touch pressure according to an embodiment of the present invention. Each steps of FIG. 4 described below may be performed by the digital device of the present invention. For example, the processor 110 in the digital device 100 is capable of controlling each step in FIG. 4, based on the control command of the content control module 200 of the digital device 100 illustrated in FIG. 3.

First, the digital device obtains image data sensed by a camera unit (S410). Further, the digital device also obtains an illumination value sensed by an illumination sensor (S420). Next, the digital device extracts color information of the above-obtained image data (S430). According to the embodiment of the present invention, the color information of the image data includes RGB component values of the image data.

Next, the digital device determines whether a touch input on the camera unit has been performed (S440). If the color information of the image data in the embodiment of the present invention includes the RGB component values, the digital device is capable of determining whether the touch input has been performed based on at least one component value among the above RGB component values. For example, if R-value among the obtained RGB component values meets at least one of the following conditions, the digital device may determine that the touch input on the camera unit has been performed.

i) The R-value is greater than a predefined critical value,
  ii) The R-value is greater by a predefined value or over than G-value or B-value,
  iii) The R-value is greater by a predefined value or over than G-value and B-value,
  iii) The R-value is greater by a predefined value or over than an average of G-value and B-value, The comparison of the RGB components may be performed against any pixel of the image data, average of pixels in a specific area, or average of the whole pixel.

According to another embodiment of the present invention, the digital device may determine whether the touch input on the camera unit has been performed by using the touch sensors around the camera unit. When a user performs the touch input on the camera unit, the area around the camera unit is also touched along with the camera unit. Therefore, the digital device equipped with the touch sensors around the camera unit is capable of determining whether the touch input on the camera unit has been performed based on the sensed value of the touch sensor. If it is determined that the touch input on the camera unit has been performed in the above S440, the digital device detects touch pressure of the touch input based on the color information and the illumination value (S450).

According to the embodiment of the present invention, the sensed touch pressure may be in proportionate to the R-value of the image data obtained by the digital device. Or, the sensed touch pressure may be in proportionate to an average value of at least two components among the R-value, the G-value, and the B-value of the image data. Further, the lower the illumination value obtained by the digital device is, the higher the touch pressure may be sensed. According to one embodiment of the present invention, the digital device is capable of calculating the touch pressure on the camera unit by using a mapping table of the touch pressure corresponding to the color information of the image data and the illumination value.

According to the embodiment of the present invention, the digital device is capable of sensing the touch pressure in predefined levels by using the color information of the obtained image data and the illumination value. For example, the digital device is capable of sensing the touch pressure in three levels, i.e. strong, medium, and weak. In this case, the touch pressure sensed by the digital device may have an identical pressure value in a specific range of the RGB component values and the illumination value.

Further, according to the embodiment of the present invention, the digital device is capable of adjusting a sensitivity of the sensed touch pressure against a variation of the RGB component values of the image data. Therefore, the higher the illumination value of the digital device is, the smaller the difference of the touch pressure sensing value corresponding to an identical variation of the component values of the image data is. As described above, the R-value variation of the image data according to the touch pressure variation under high external illumination condition is greater than that under low external illumination condition.

Meanwhile, in the above steps S410 to S450, it is described that the digital device uses the extracted RGB component values of the image data, but the color information of the image data is not limited thereto. For example, the digital device obtaining image data in YCbCr format may determine the touch input and sense the corresponding touch pressure by using at least one component value among the corresponding YCbCr component values. Or, the digital device in the present invention may convert the YCbCr format into the RGB format, which is to be used.

Figure 5:
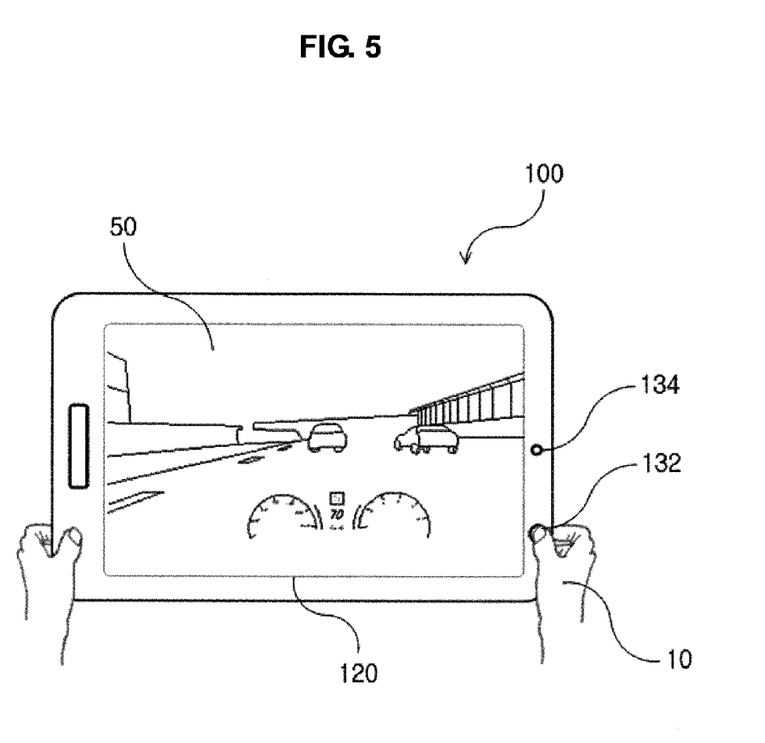
FIG. 5 is a drawing illustrating a scene of controlling the content of the digital device by using the method for sensing touch pressure according to an embodiment of the present invention.

FIG. 5 is a drawing illustrating a scene of controlling content 50 of the digital device 100 by using the method for sensing the touch pressure according to an embodiment of the present invention. The digital device 100 is capable of providing various forms of the content 50 through the display unit 120. Those forms of the content 50 may include content performing different levels of operation depending on an input strength. In the content 50 illustrated in FIG. 5, which represents a car racing game, the digital device 100 is capable of controlling an accelerator operation of a vehicle in the content 50 based on a user's touch input on a camera unit 132. In this case, the digital device 100 may increase an acceleration power of the vehicle when the sensed touch pressure gets higher according to the embodiment of the present invention. Therefore, the digital device 100 according to the embodiment of the present invention is capable of sensing not only a presence of the touch input but also the touch pressure of the touch input, and is capable of controlling at least one operation of the content 50. Further, the digital device 100 is capable of applying the inputs in various levels to the content 50 based on the sensed touch pressure. Meanwhile, in the embodiment of FIG. 5, individual operations with which the digital device 100 controls the content 50 based on the touch pressure may be performed by the control command of the content control module 200, which is described in FIG. 3.

Figure 6:
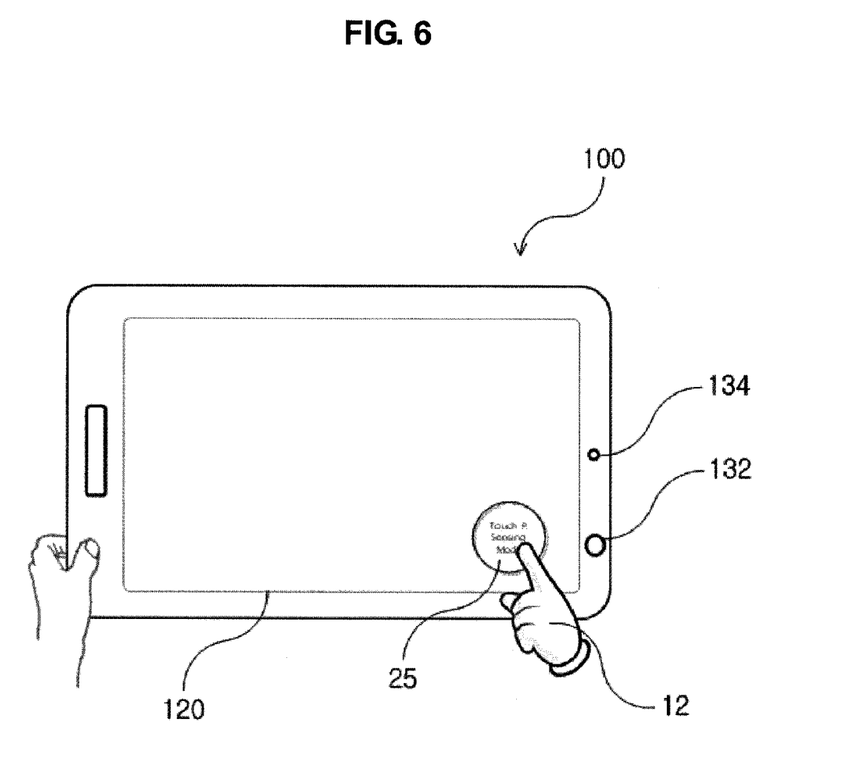
FIG. 6 is a drawing illustrating the first embodiment of a digital device in the present invention changing into the touch pressure sensing mode.
Figure 7:
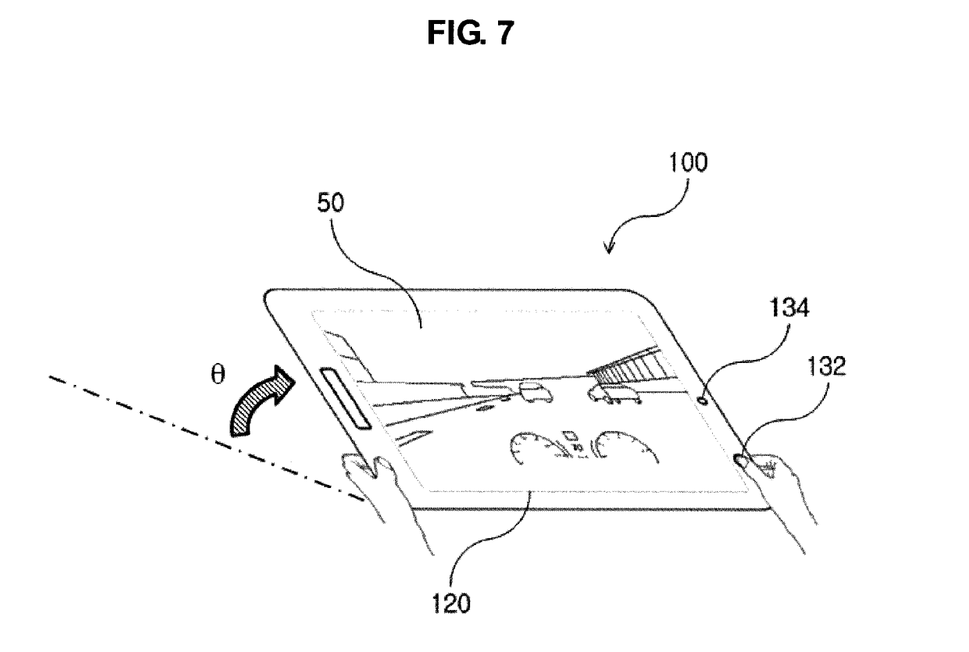
FIGS. 7 and 8 are drawings illustrating the second embodiment of the digital device in the present invention changing into the touch pressure sensing mode.
Figure 8:
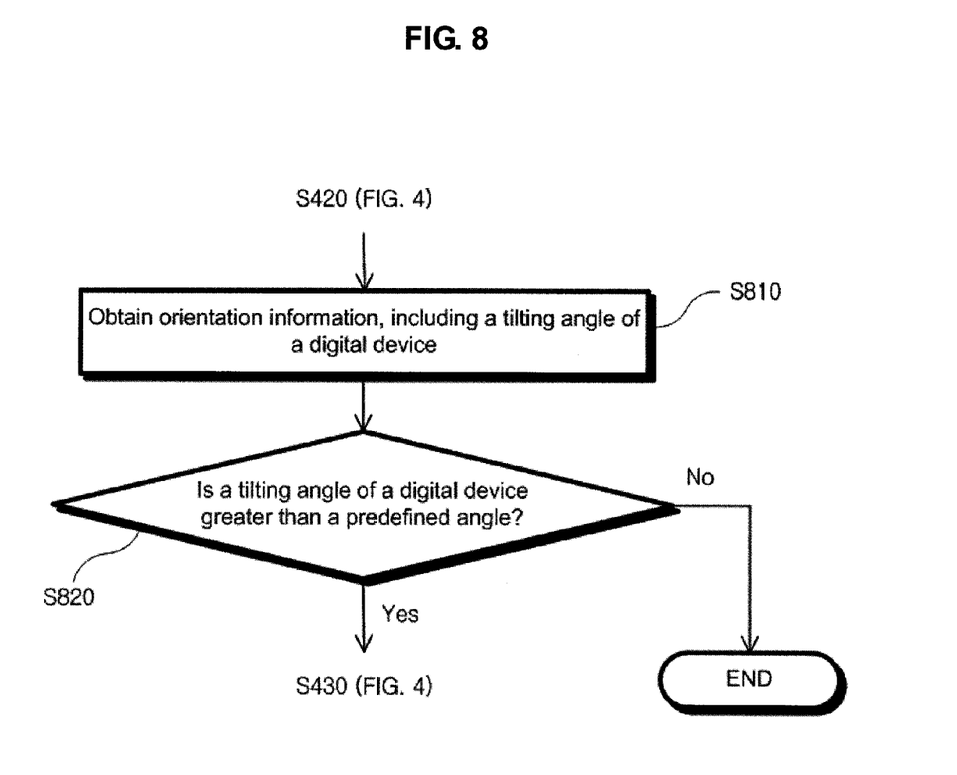

FIGS. 6 to 8 represent embodiments of the present invention, where the digital device 100 converts into a touch pressure sensing mode.

In the embodiments of the present invention, the touch pressure sensing mode indicates a mode to sense the touch pressure of the user's touch input on the camera unit 132 of the digital device 100. In the touch pressure sensing mode, the camera unit 132 and the illumination sensor 134 of the digital device 100 are activated, and the touch pressure is sensed based on the image data detected by the camera unit 132 and the illumination value detected by the illumination sensor 134. Therefore, the digital device 100 in the touch pressure sensing mode is capable of performing steps S430 to S450 in FIG. 4. According to the embodiments of the present invention, the digital device 100 may determine the touch input on the camera unit 132 automatically by analyzing the image data sensed by the camera unit 132, but the camera unit 132 and the illumination sensor 134 should be always activated, which may be a challenge. Further, in a specific environment (for example, the environment with red lightings), the device may sense wrongly touch inputs on the camera unit 132 even though there is no touch input. Therefore, the digital device 100 in the present invention is capable of providing an additional interface for entering into the touch pressure sensing mode.

Referring to FIG. 6, the digital device 100 is capable of providing a mode switching interface 25 for entering into the touch pressure sensing mode. The mode switching interface 25 may be provided on the display unit 120 of the digital device 100, or through an additional button mounted on the digital device 100. The digital device 100 is capable of switching to the touch pressure sensing mode corresponding to the user input 12 on the mode switching interface 25. Meanwhile, the mode switching interface 25 may be provided in a form, where it enters into the touch pressure sensing mode based on a user's voice command or a gesture input.

Next, referring to FIGS. 7 and 8, the digital device 100 is capable of entering into the touch pressure sensing mode based on orientation information of the corresponding device. For example, the digital device 100 may obtain the orientation information of the device (S810), wherein the obtained orientation information of the digital device 100 includes tilting angle (θ) of the digital device 100. The user may tilt the digital device 100 over a certain angle when performing the touch input on the camera unit 132 while using the content 50 through the digital device 100. Therefore, the digital device 100 may determine whether the tilting angle (θ) is over a predefined angle (S820), and may switch to the touch pressure sensing mode when it is over the predefined angle. Meanwhile, in the embodiments of the present invention, a reference orientation to detect the tilting angle (θ) of the digital device 100 may be adjusted differently based on the configuration of the digital device 100. For example, the digital device 100 may reverse the reference orientation based on the settings, such as whether the camera unit 132 is on the right hand or on the left hand of the user.

In the above description, the present invention is described based on specific embodiments, but those skilled in the art may modify or change them without departing from the spirit and scope of the present invention. Therefore, the results that may be inferred easily from the detailed description and embodiments can be interpreted as falling within the scope of the claims of the present invention.

What is claimed is:

1. A method for sensing touch pressure, comprising:
obtaining image data sensed by a camera unit of a digital device;
obtaining an ambient illumination value around the digital device, the ambient
illumination value being sensed by an illumination sensor of the digital device; extracting color information for the image data; determining whether a touch input has been performed on the camera unit; and estimating a touch pressure of the touch input based on both of the extracted color information and the obtained ambient illumination value, when it is determined that the touch input has been performed in the determination step,
wherein the estimated touch pressure is proportional to at least one component value in the color information,
wherein the estimating step establishes a sensitivity of the touch pressure corresponding to a variation of the at least one component value lower, as the obtained ambient illumination value is higher.

2. The method of claim 1,
wherein the determining step includes determining whether the touch input has been performed on the camera unit based on at least one component value in the color information.

3. The method of claim 2,
wherein the determining step includes determining that the touch input has been performed when a first component value in the color information is greater than a predefined value.

4. The method of claim 2,
wherein the determining step includes determining that the touch input has been performed when a first component value in the color information is greater by a predefined value or over than a second component value.

5. The method of claim 2,
wherein the determining step includes determining that the touch input has been performed when a first component value in the color information is greater by a predefined value or over than an average of a second component value and a third component value.

6. The method of claim 1,
wherein the color information includes RGB component values.

7. The method of claim 1,
wherein the lower the obtained ambient illumination value is, the higher the estimated touch pressure is.

8. The method of claim 1, further comprising:
providing content on a display unit; and
controlling at least one operation on the content based on the estimated touch pressure.

9. The method of claim 1, further comprising:
providing a mode switching interface for the digital device to switch to the touch pressure sensing mode,
wherein the extracting, the determining, and the estimating steps are performed, when the mode is switched to the touch pressure sensing mode by the user's input on the mode switching interface.

10. The method of claim 1, further comprising:
obtaining orientation information of the digital device,
wherein the orientation information includes a tilting angle of the digital device, and
wherein the extracting, the determining, and the estimating steps are performed, when the tilting angle is greater than a predetermined angle.

11. A digital device comprising: a processor configured to control operation of the digital device;
   a camera unit configured to sense an image data, and deliver the sensed image data to the processor; and
   an illumination sensor configured to sense an ambient illumination value around the digital device and deliver the sensed ambient illumination value to the processor,
   wherein the processor is further configured to:
   obtain the image data sensed by the camera unit, obtain the ambient illumination value sensed by the illumination sensor, extract color information for the image data, determine whether a touch input has been performed on the camera unit, and estimate a touch pressure of the touch input based on both of the extracted color information and the obtained ambient illumination value, when it is determined that the touch input has been performed,
   wherein the estimated touch pressure is proportional to at least one component value in the color information,
   wherein a sensitivity of the touch pressure corresponding to a variation of the at least one component value is established lower, as the obtained ambient illumination value is higher.

12. The digital device of claim 11,
wherein the processor is further configured to:
determine whether the touch input has been performed on the camera unit based on at least one component value in the color information.

13. The digital device of claim 12,
wherein the processor is further configured to:
determine that the touch input has been performed when a first component value in the color information is greater than a predefined value.

14. The digital device of claim 12,
wherein the processor is further configured to:
determine that the touch input has been performed when a first component value in the color information is greater by a predefined value or over than a second component value.

15. The digital device of claim 12,
wherein the processor is further configured to:
determine that the touch input has been performed when a first component value in the color information is greater by a predefined value or over than an average of a second component value and a third component value.

16. The digital device of claim 11,
wherein the color information includes RGB component values.

17. The digital device of claim 11,
wherein the lower the obtained ambient illumination value is, the higher the estimated touch pressure is.

18. The digital device of claim 11,
wherein the processor is further configured to:
provide content on a display unit, and control at least one operation of the content based on the estimated touch pressure.

19. The digital device of claim 11,
wherein the processor is further configured to:
provide a mode switching interface for the digital device to switch to the touch pressure sensing mode,
perform the extracting operation, the determining operation, and the estimating operation, when the mode is switched to the touch pressure sensing mode by the user's input on the mode switching interface.

20. The digital device of claim 11,
wherein the processor is further configured to:
obtain orientation information of the digital device, wherein the orientation information includes a tilting angle of the digital device, and
perform the extracting operation, the determining operation, and the estimating operation, when the tilting angle is greater than a predetermined angle.

* * * * *